J. K. TOLES.
FIBER CONVEYING AND REVERSING APPARATUS.
APPLICATION FILED SEPT. 17, 1907.
944,583.
Patented Dec. 28, 1909.
2 SHEETS—SHEET 1.
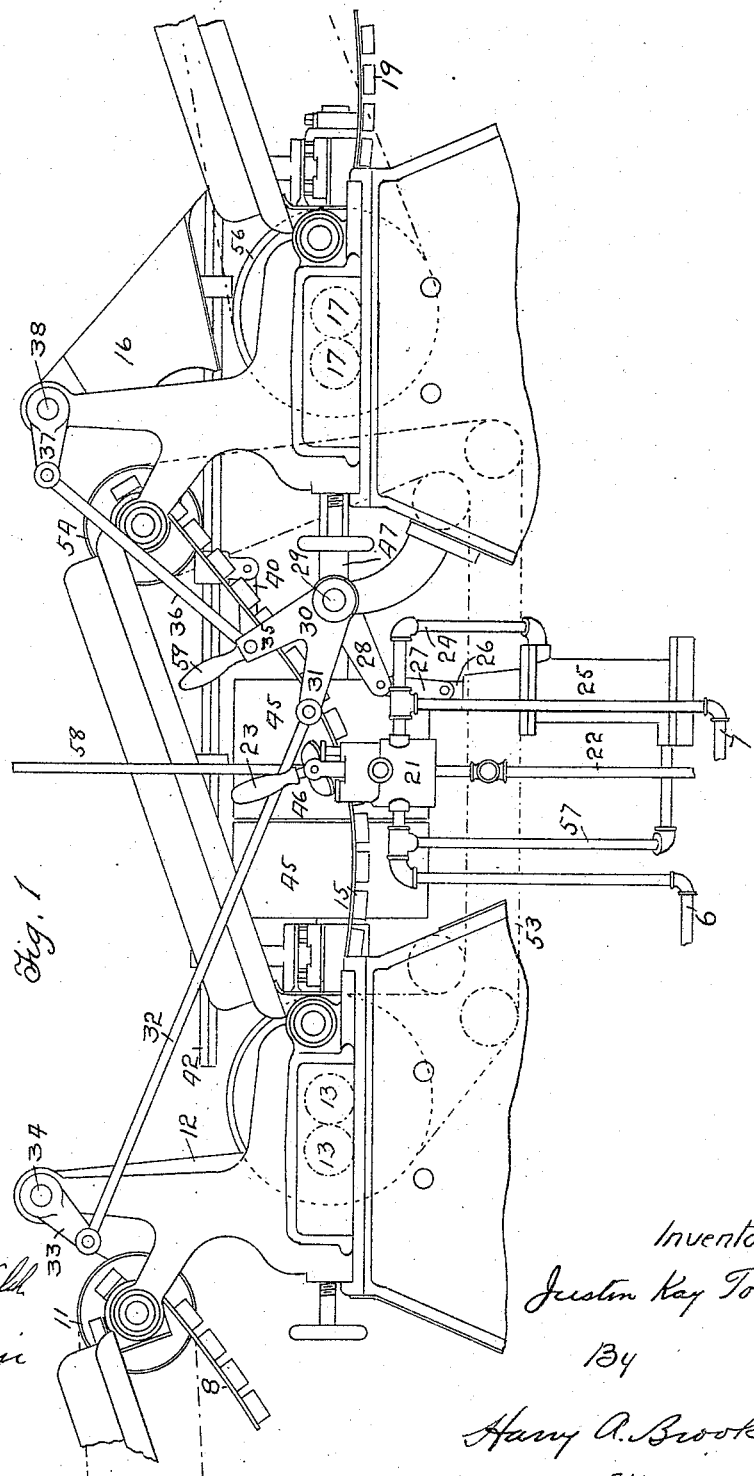

J. K. TOLES.
FIBER CONVEYING AND REVERSING APPARATUS.
APPLICATION FILED SEPT. 17, 1907.
944,583.
Patented Dec. 28, 1909.
2 SHEETS—SHEET 2.
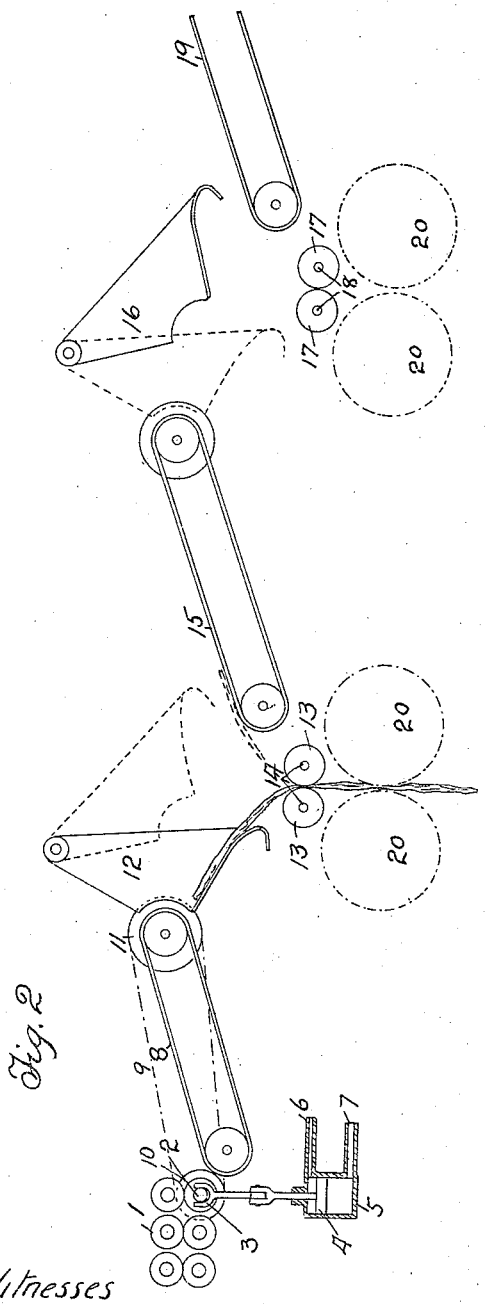
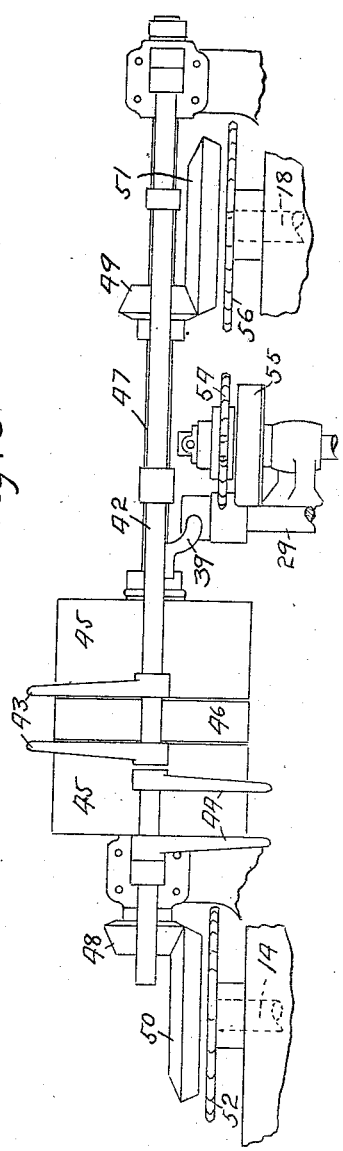
Witnesses
Margaret Walsh
E. V. McWain
Inventor
Justin Kay Toles
By
Harry A. Brooks
Attorney

UNITED STATES PATENT OFFICE.

JUSTIN KAY TOLES, OF LOS ANGELES, CALIFORNIA.

FIBER CONVEYING AND REVERSING APPARATUS.

944,583.  Specification of Letters Patent.  Patented Dec. 28, 1909.

Application filed September 17, 1907. Serial No. 393,408.

*To all whom it may concern:*

Be it known that I, JUSTIN KAY TOLES, a citizen of the United States of America, residing at Los Angeles, in the county of Los Angeles, State of California, have invented a certain new and useful Fiber Conveying and Reversing Apparatus; and I do hereby declare the following to be a full, clear, and exact description of the invention, such as will enable others skilled in the art to which it appertains to make and use the same.

This invention relates to fiber preparing apparatus and more particularly to that part of such apparatus whose function is to present the fiber to the appliances for treating it, and to hold it in position while being treated.

This invention consists substantially of devices for gripping and feeding fiber, a conveyer to deliver fiber to said devices, a conveyer to receive fiber from said devices and means to guide the fiber from the first conveyer to the gripping devices and also to transfer the free end of the fiber, in a reversed position, to the second conveyer; together with the mechanism necessary to actuate the foregoing.

One form of the invention is herein described, and is illustrated in the accompanying drawings, in which—

Figure 1 is a side elevation of the apparatus with portions broken away. Fig. 2 is a diagram showing mode of handling fiber, and Fig. 3 is a plan view of the mechanism for reversing the grip rolls.

Reference numeral 1 designates a set of breaker rolls which may be of any preferred construction.

Numeral 2 designates a shaft to which, by means of a clutch 3, motion may be transmitted from any source of power (not shown). Clutch 3 is operated by a piston 4, in a cylinder 5, said piston being actuated preferably by air pressure, through pipes 6 and 7. A conveyer 8 situated at the discharge end of rolls 1, is driven by a sprocket chain 9, passing over sprocket wheel 10 on shaft 2, and sprocket wheel 11 at the upper end of said conveyer.

At the discharge end of conveyer 8 is located a cradle 12, which is adapted to guide material delivered by conveyer 8, between feed and grip rolls 13, mounted upon shafts 14, said rolls being geared in the usual manner. At the discharge end of rolls 13 is situated a second conveyer 15, which delivers material to a second cradle 16, which when in the position indicated by the dotted lines in Fig. 2, guides the fiber between feed and grip rolls 17, upon shafts 18. At the discharge end of the rolls 17, is a third conveyer 19, which may deliver the treated material to any desired place.

Reference numerals 20 designate appliances of any suitable character for scutching, combing, carding, or otherwise treating the material. These appliances are not particularly described or illustrated, as they form no part of this invention.

The oscillation of cradles 12 and 16, the stoppage and starting of breaker rolls 1, conveyers 8 and 19, the reversal of the direction of rotation of rolls 13 and 17, is effected by mechanism, a description of which is as follows: A valve 21 is connected by means of pipe 22, with a source of air pressure (not shown). When the handle 23 of said valve is in the position shown in Fig. 1, air passes from pipe 22 to pipe 24, which connects with pipe 7, leading to the lower end of cylinder 5. Pipe 24 is also in communication with the upper end of cylinder 25, wherein is a piston connected to a piston rod 26, which by means of connecting rod 27 is connected to lever 28, mounted on rock shaft 29. Upon rock shaft 29 is mounted lever 30, the lower arm 31 whereof by means of connecting rod 32 communicates motion to crank 33, mounted on shaft 34, supporting cradle 12. The upper arm 35 of lever 30 by means of connecting rod 36 communicates motion to crank 37, mounted on shaft 38, supporting cradle 16. At the side of the machine remote from that shown in Fig. 1, shaft 29 carries lever 39, which by means of a connecting rod 40 (Fig. 1) communicates motion to a shifter rod 42, having thereon shifter arms 43 and 44, which throw straight or twisted belts (not shown) off of loose pulleys 45 on to tight pulley 46, or vice versa. Pulley 46 is fast to shaft 47, which carries bevel pinions 48 and 49, which respectively drive in opposite directions gears 50 and 51, mounted on shafts 14 and 18. Secured to shaft 14 is a sprocket 52, which by means of chain 53 communicates motion to sprocket 54, driving conveyer 15. Sprocket 54 has a ratchet clutch 55, whereby conveyer 15 is allowed to remain at rest while rolls 13 are feeding material in a downward direction, and is operated when material is being progressed upward by said rolls. Upon shaft 18 is mounted sprocket 56, which communicates motion in a similar manner to conveyer 19, which also has a ratchet clutch (not shown). The left-hand outlet of valve 21 communicates with pipe 57, connected to pipe 6 and also to bottom of cylinder 25. An exhaust pipe 58 is provided for valve 21. A handle 59 is provided on lever 30 so that the mechanism may be moved slowly for purposes of adjustment, examination, etc.

The mode of operation is as follows: Handle 23 being in the position indicated in Fig. 1, a quantity of material to be treated is fed to the rolls 1. Passing through said rolls, it falls upon conveyer 8, which delivers it to cradle 12, the latter guiding it between rolls 13, which feed it down between the first set of appliances 20. When a little over one-half the length of the material has passed between apliances 20, handle 23 is moved to the right. This admits air to pipe 57 and to pipe 6. The air enters the top of cylinder 5 and throws out clutch 3, thereby stopping the breaker rolls 1, and conveyer 8; the latter as already mentioned being driven by the same clutch. A portion of the air passing through pipe 57 enters the lower part of cylinder 25, forces piston rod 26, connecting rod 27, and lever 28 in an upward direction thereby partially rotating shaft 29, and drawing cradle 12 toward the discharge end of the machine, whereby the free end of the material lying thereon is thrown on to conveyer 15 in a reversed position. At the same time cradle 16 is moved into the position indicated by the dotted lines in Fig. 2. By the mechanism previously described, the belts are changed on pulley 46, thus reversing the direction of the rotation of shaft 47 and rolls 13 and 17. This causes rolls 13 to draw the material upward, and conveyer 15 now running, the fiber is delivered to cradle 16, which guides it to rolls 17. They feed the untreated end of the material between the second set of appliances 20, whereby the same treatment is afforded and completed. Handle 23 is then restored to its original position, whereupon cradle 16 throws the free end of the material on to conveyer 19. Rolls 17 now rotating in a reverse direction, draw the material upward and conveyer 19 delivers it to any desired place. At the same time another portion of material being delivered to rolls 13, the operation is repeated.

I claim:

1. In a machine of the class specified, in combination, two instrumentalities for scutching opposite ends of a fiber stalk, conveying means intermediate of said scutching instrumentalities, means for feeding one end of the stalk to one of the scutching instrumentalities, means to transfer the other end of the stalk to said conveying means, and means to reverse the feeding means.

2. In an apparatus of the class specified, in combination, two appliances for treating fiber, means for feeding one end of the fiber to one of the appliances, means to convey the fiber from said feeding means to the other of said appliances, mechanism to transfer the free end of the fiber to said conveying means, and means to reverse the feeding means.

3. In combination, means for treating fiber comprising two instrumentalities for scutching opposite ends of fiber stalks, a conveyer, grip rolls, a second conveyer associated with said instrumentalities and having its receiving end contiguous to said grip rolls, and a cradle to receive material from said first conveyer and guide it between said grip rolls; and also to deposit the free end of said material upon said second conveyer.

4. In an apparatus of the class specified, in combination, two appliances for treating opposite ends of fiber, a conveyer, means to feed one end of the fiber to one of said appliances, means for reversing the direction of operation of said feeding means, a second conveyer operative upon the reversal of direction of operation of the feeding means to receive and convey the fiber to the other of said appliances, and mechanism for guiding the fiber from said first conveyer to said feeding means and for transferring the free end of said fiber onto said second conveyer.

5. In combination, means for treating fiber comprising two instrumentalities for scutching opposite ends of fiber stalks, a conveyer, grip rolls, a second conveyer intermediate of said instrumentalities and having its receiving end contiguous to said grip rolls, mechanism for guiding material from said conveyer to said grip rolls and for transferring the free end of said material on to said second conveyer and manually controlled means for reversing the direction of rotation of said grip rolls.

6. In combination, means for treating fiber, comprising two instrumentalities for scutching opposite ends of fiber stalks, a conveyer, grip rolls, a second conveyer intermediate of said instrumentalities, and having its receiving end contiguous to said grip rolls, mechanism for guiding material from said first conveyer to said grip rolls and for transferring the free end of said material on to said second conveyer, means to reverse the direction of rotation of the grip rolls, and means for suspending the operation of either of said conveyers while the other is in operation.

7. In an apparatus of the class specified, in combination, two appliances for treating opposite ends of fibrous material, rolls to feed the material to said appliances, means to guide the material to said feed rolls, means to convey the material from the feed rolls actuated from the rolls on reversal of direction of rotation of said rolls, means to reverse the direction of rotation of the rolls, and mechanism actuating said guiding means to transfer the free end of the material to said conveying means.

8. In an apparatus of the class specified, in combination, two fiber treating appliances, rolls to grip the fiber and feed it to one of said appliances, mechanism to guide the fiber to, and a conveyer intermediate of said appliances to receive the fiber from said rolls, means to actuate said guiding mechanism to transfer the free end of the fiber to said conveyer, driving mechanism for said rolls and said conveyer, including a ratchet clutch associated with said conveyer.

9. In combination, means for treating fiber, comprising two instrumentalities for scutching opposite ends of fiber stalks, feeding devices associated therewith, conveying aprons, transferring devices associated therewith, a set of breaker rolls and means to simultaneously reverse the action of said feeding devices and stop said breaker rolls and one of said conveying aprons contiguous to said breaker rolls.

10. In combination, instrumentalities for scutching opposite ends of fiber stalks, devices associated with one of said instrumentalities for feeding said stalks, separate devices for conveying stalks to, and conveying them away from, said feeding devices, and mechanism for reversing the direction of rotation of said feeding devices and actuating the devices conveying stalks from said feeding devices.

11. In combination, two instrumentalities for treating fiber, devices for feeding to one of said instrumentalities fiber, separate devices for conveying fiber to, and conveying fiber away from, said feeding devices, and mechanism actuated by fluid pressure for suspending the operation of one of said conveying devices while the other is in operation.

12. In combination, two instrumentalities for treating opposite ends of fibrous material, feeding means associated with one of said instrumentalities, means for reversing the direction of operation of said feeding means, a conveyer for conveying material from said feeding means to the other instrumentality, and means for transferring to said conveyer the free end of material to be conveyed from said feeding means.

13. In combination, two instrumentalities for treating fibrous material, feeding means associated with one of said instrumentalities, means for reversing the direction of operation of said feeding means, separate conveyers for conveying material to and from said feeding means, means for transferring to the conveyer the free end of material to be conveyed from said feeding means, and means for suspending the operation of conveyance of material to said feeding means while material is being conveyed from said feeding means.

14. In an apparatus of the class specified, in combination, two appliances for treating fiber, means for feeding one end of the fiber to one of the appliances, means to reverse the feeding means, means actuated from the feeding means when reversed to convey the fiber away therefrom, and means whereby the untreated end of the fiber is transferred to the conveying means at the same time that the feeding means are reversed.

15. In an apparatus of the class specified, in combination, two instrumentalities for treating opposite ends of fiber, feed rolls associated with one of said instrumentalities, a conveyer disposed intermediate of said instrumentalities to convey fiber from said rolls to the other of said instrumentalities, means to reverse the direction of rotation of said rolls, means actuated at the same time the direction of rotation of the rolls is reversed to operate said conveyer, and means to transfer onto said conveyer the free end of the fiber removed from said rolls.

In testimony whereof, I have signed my name to this specification in the presence of two subscribing witnesses at Los Angeles, county of Los Angeles, State of California, this 6th day of September, A. D. 1907.

JUSTIN KAY TOLES.

Witnesses:
MARGARET WALSH,
LUCY E. WHEELER.